United States Patent
Chen et al.

[11] Patent Number: 6,094,445
[45] Date of Patent: Jul. 25, 2000

[54] HIGH-EFFICIENCY CAVITY DOUBLING LASER

[75] Inventors: Yung-Fu Chen, Jang-huah; Chi-Luen Wang, Shin-jwu; Chien Yen-Jen; Jang Chaur-Sen, both of Taipei Shiann, all of Taiwan

[73] Assignee: Simpatico Industries Co., Ltd., Taipei, Taiwan

[21] Appl. No.: 09/148,875

[22] Filed: Sep. 8, 1998

[51] Int. Cl.[7] .............................................. H01S 3/10
[52] U.S. Cl. ............................................. 372/21; 372/22
[58] Field of Search ............................................. 372/21, 22

[56] References Cited

U.S. PATENT DOCUMENTS 5,802,086  9/1998  Hargis et al. ........................... 372/22
5,966,392  10/1999  Chen et al. ............................ 372/22

OTHER PUBLICATIONS

Tucker et al, Stimulated-emission cross section at 1064 and 1342 nm in Nd:YVO4, Dec. 1977, Journal of Applied Physics, pp. 49094910.

*Primary Examiner*—Frank G. Font
*Assistant Examiner*—Armando Rodriguez
*Attorney, Agent, or Firm*—Bacon & Thomas

[57] ABSTRACT

A high-efficiency cavity doubling laser according to the invention contains a laser diode, a laser crystal and a non-linear crystal, is characterized in having a first gap between the laser diode and the laser crystal and a second gap between the laser crystal and the non-linear crystal. Therefore, heat created by the laser crystal can be dissipated by the air gaps and cannot be directly conducted to the laser diode and the non-linear crystal. Furthermore, the thermal distortion of the laser crystal can be compensated by adjusting the position of the non-linear crystal, thereby increasing the efficiency of the laser.

3 Claims, 1 Drawing Sheet

HIGH-EFFICIENCY CAVITY DOUBLING LASER

BACKGROUND OF THE INVENTION

1. Field of the Invention

The invention relates to a laser, and in particular to a high-efficiency cavity doubling laser.

2. Description of the Related Art

To date, laser has been widely used in many areas, such as military, prospecting, manufacturing industry, processing, medical treatment, business and advertisement. when manufacturing a laser, how to shrink the size of the laser, increase its operating stability and efficiency needs to be taken into consideration. A laser with a small size, simple structure and better stability was disclosed in U.S. Pat. No. 4,847,851. Furthermore, a high-efficiency laser was disclosed in another U.S. Pat. No. 5,539,76669. However, there are more rooms left for further improving the lasers described in these U.S. patents. The present invention relates to an improved solid laser.

SUMMARY OF THE INVENTION

A first object of the invention is to provide a high-efficiency laser which uses air gaps for heat dissipation. A second object of the invention is to provide a high-power laser with a better heat dissipation function. A third object of the invention is to provide a laser with a small size, simple structure, being easily manufactured. A fourth object of the invention is to provide a laser with a best efficiency which is obtained by adjusting the position of a thermal optic device to compensate the thermal distortion thereof.

BRIEF DESCRIPTION OF THE DRAWINGS

The invention will become more fully understood from the detailed description given hereinbelow and the accompanying drawings which are given by way of illustration only, and thus do not limit the present invention, and wherein.

BRIEF DESCRIPTION OF THE REFERENCE NUMERALS

10—a laser disclosed in U.S. Pat. No. 4,847,851, 11—a laser diode, 1—a laser crystal, 13—a resonant cavity device, 14—curved surface, 15—an inner surface, 20—a laser disclosed in U.S. Pat. No. 5,539,765, 21—an excitation light source, 22—a focusing device, 23—a KTP crystal, 24—a transparent glue, 25—an entrance surface, 26—an exit surface, 30—a laser according to the invention, 31—an excited surface, 32—a non-linear crystal, 33—a back surface, 40—a first gap and 42—a second gap.

DETAILED DESCRIPTION OF THE EMBODIMENTS

Figure 1:
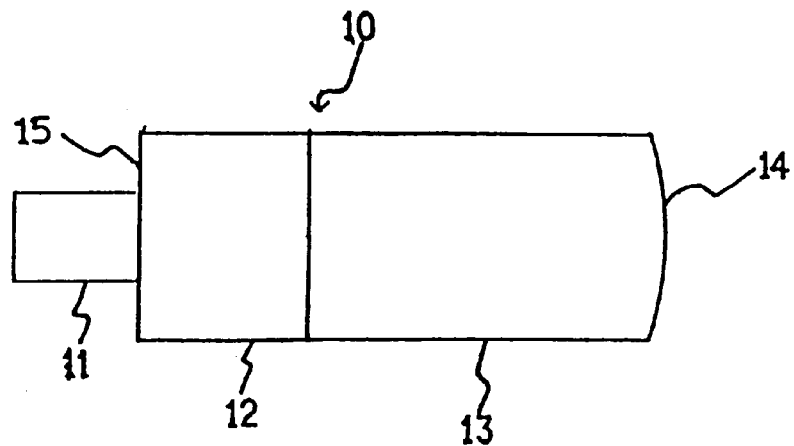
FIG. 1 is a cross-sectional view illustrating the structure of a laser disclosed in U.S. Pat. No. 4,847,851.

Referring to FIG. 1, a laser 10 disclosed in U.S. Pat. No. 4,847,851 is shown. In FIG. 1, a laser diode 11, serving as an excitation light source, a laser crystal 12 and a resonant cavity device 13 are directly stuck on each other, wherein a curved surface 14 is located on the resonant cavity device 13. When the laser diode 11 is used to excite the laser Crystal 12, a part of energy is converted into a laser beam which is further intensified by a resonance effect performed between an inner surface of the laser crystal 12 and the curved surface 14 of the resonant cavity device 13, and then released from the curved surface 14. However, the other part of energy is converted into heat, causing the temperature of the laser crystal 12 increased. Since the laser diode 11 is firmly combined with the laser crystal 12, the temperature variation of the laser crystal 12 directly affects and causes the laser diode 11 to rise the temperature thereof. If the temperature of the laser diode 11 is too high, the operating efficiency of the laser diode 11 is greatly reduced. Therefore, the laser 10 needs to install a temperature detecting device and temperature cooling device to control the temperature. Furthermore, the resonant direction of the laser beam must be aligned with the axis passing through the top of the curved surface 14 so as to obtain a better efficiency even though the designed curved surface 14 can reach a stable resonance. As a result, the laser diode 11, laser crystal 12 and resonant cavity device 13 must be precisely combined to each other. This causes the laser manufacturing more difficult.

Figure 2:
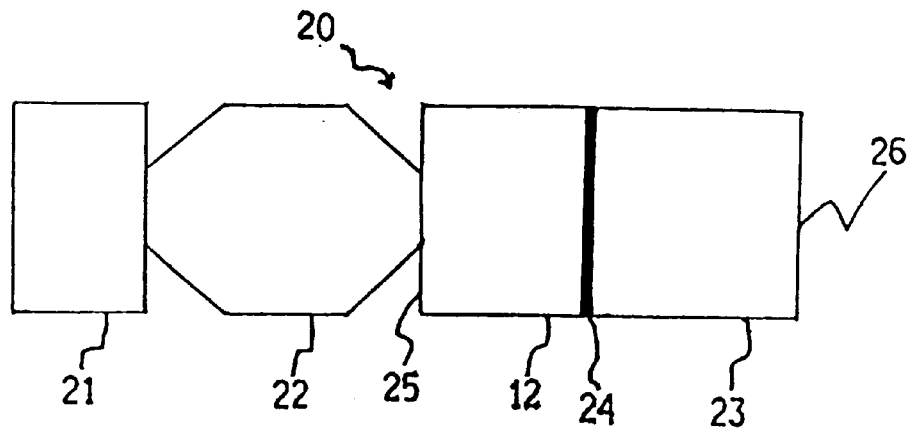
FIG. 2 is a cross-sectional view illustrating the structure of a laser disclosed in U.S. Pat. No. 5,539,765.

Referring to FIG. 2, another laser 20 disclosed in U.S. Pat. No. 5,539,765 is shown. In FIG. 2, a light beam (not shown) generated by an excitation light source 21 is focused on an entrance surface 25 of a laser crystal 12 by a focusing device 22, wherein the laser crystal 12 is directly stuck on a KTP crystal 23 by a transparent glue. As compared to the plane-to-curved surface resonant cavity design described in U.S. Pat. No. 4,847,851, this laser adopts a plane-to-plane resonant cavity design with a simpler assembly and a stable cavity resonance which is implemented by a thermal lens effect created on the entrance surface 25 of the laser crystal 12. However, this thermal lens is an imperfect spherical symmetry and have a aberration and distortion. This causes obvious power consumption during high-power operation. As can be seen from FIG. 2, the laser crystal 12 is not directly stuck on the excitation light source 21, so heat created by itself cannot be conducted to the excitation light source 21 to affect the operating efficiency thereof. However, the temperature variation caused by the laser crystal 12 can directly affect and cause the KTP crystal 23 to loss phase matching because the laser crystal 12 and the KTP crystal 23 are stuck on each other. Therefore, the fundamental light of the laser beam cannot be efficiently converted into a doubling light by the KTP crystal 23, resulting in greatly reducing the efficiency of the laser 20.

Figure 3:
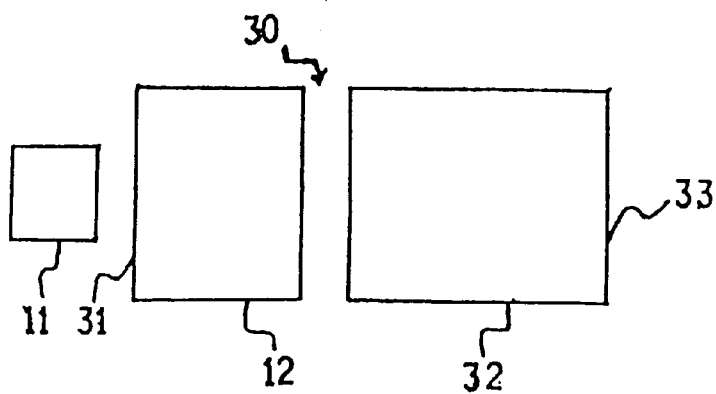
FIG. 3 is a cross-sectional view illustrating the structure of a laser according to the invention.

Referring to FIG. 3, a laser 30 according to the invention comprises a laser diode 11, a laser crystal 12 and a non-linear crystal 32 which are not stuck on each other. Instead, they are separated from each other, wherein two gaps including a first gap 40 and a second gap 42, exits therebetween. In addition, an excited surface 31 of the laser crystal 12 and the other surface thereof opposite to the exited surface 31 and a back surface 33 of the non-linear crystal 32 and the other surface thereof opposite to the back surface 33 are coated with optical films. According to the invention, due to the gaps between the laser crystal 12, laser diode 11 and non-linear crystal 32, heat created during operation cannot be directly conducted to the laser diode 11 and non-linear crystal 32 to affect the operating efficiency thereof. Therefore, regardless of high-power or lower-power operating, the laser 30 according to invention greatly can raise it's own operating efficiency. Moreover, unlike the lasers 10 and 20 stated in FIGS. 1 and 2, it is not necessary to install any additional temperature detecting device, temperature cooling device and focusing device for the laser 30 of the invention, resulting in a simple structure. Furthermore, unlike the laser 20 described in FIG. 2, the temperature variation of the laser crystal 12 during operation cannot directly affect and cause the KTP crystal 23 to loss phase matching, because the non-linear crystal 32 and laser crystal 12 are not stuck on each other. Consequently, the problem of being unable to convert the fundamental light of the laser beam into a doubling light through the KTP crystal 23 (shown in FIG. 2) thereby to greatly reduce the efficiency is resolved. And, the angle of inclination of the vertical optical axis of the non-linear crystal 32 can be adjusted to compensate the thermal distortion of the laser crystal 12. As compared to the lasers 10 and 20 of FIGS. 1 and 2, the laser 30 according to the invention has a better operating efficiency. That is, in the laser 30 of the invention, more part of energy is converted into a laser beam while less part of energy is converted into unexpected heat. Accordingly, the invention can be used for a high-power laser by selecting a high-power laser diode 11 to increase the output power thereof.

Furthermore, according to the laser 30 of the invention, the laser crystal 12 is an a axis-cut Nd-doped YVO4 laser crystal with a dopant concentration of 2%. The dimension of the laser crystal 12 is 3×3×1 mm$^3$, wherein the length thereof in the same direction with the laser beam is 1 m. The excited surface 31 of the laser crystal 12 is coated with a high-transmission film 809 nm thick and two total reflection films 1064 nm and 532 nm thick while the other surface thereof opposite to the excited surface 31 is coated with a transmission-enhanced film 1064 nm thick. Moreover, the non-linear crystal, functioning as a doubling crystal, is a KTP crystal with a dimension of 3×3×5 mm$^3$, a Class II of phase matching and cut angles φ=23° and θ=90°. One surface of the non-linear crystal 32 close to the laser crystal 12 is coated with two transmission-enhanced films 1064 nm and 532 nm thick while the other surface 33 thereof is coated with a total reflection film 1064 nm thick and a high-transmission film 532 nm thick. The performance of the laser 30 according to the invention shows that a green ray of 50 mW is emitted under a best condition, and the light-to-light conversion rate is over 10% when the excitation power is 500 mW.

In short, the laser 30 of the invention obviously has a different structure to those of FIGS. 1 and 2 and general lasers. The laser 30 not only compensates the thermal distortion by adjusting the position of the non-linear crystal 32, but also can greatly increase the light-to-light conversion rate for both high-power and low-power lasers. In addition, it is not necessary to install any additional temperature detecting device, temperature cooling device and focusing device, leading to a simple structure and easy manufacturing.

While the invention has been described by way of example and in terms of the preferred embodiment, it is to be understood that the invention is not limited to the disclosed embodiment. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A high-efficiency cavity doubling laser comprising a laser diode, a laser crystal and a non-linear crystal, characterized in:

having a first gap between the opposite sides of the laser diode and the laser crystal and a second gap between the opposite sides of the laser crystal and the non-linear crystal;

with the provisos that the non-linear crystal is a KTP crystal and a high-transmission film 809 nm thick and the two total reflection films 1064 nm and 532 nm thick are formed on the excited surface of the laser crystal while a transmission-enhanced film 1064 nm thick is formed on the other surface of the laser crystal.

2. A laser as recited in claim 1, wherein the laser crystal is an Nd-doped YVO$_4$ laser crystal with a dopant concentration of 2%.

3. A laser as recited in claims 2 or 1, wherein two transmission-enhanced films 1064 nm and 532 nm are formed on the surface of the KTP crystal close to the laser crystal while a high-transmission film is formed on the other surface of the KTP crystal.

* * * * *